United States Patent [19]

Guardiola

[11] Patent Number: 4,819,749
[45] Date of Patent: Apr. 11, 1989

[54] AUTOMATIC WEIGHING MACHINE FOR FOOD PRODUCTS AND THE LIKE

[75] Inventor: Agustín D. Guardiola, Badalona, Spain

[73] Assignee: Talleres Daumar, SA, Barcelona, Spain

[21] Appl. No.: 156,203

[22] Filed: Feb. 16, 1988

[30] Foreign Application Priority Data

Feb. 27, 1987 [ES] Spain .................................. 8700794

[51] Int. Cl.⁴ ...................... G01G 13/00; G01G 21/28
[52] U.S. Cl. .................................... 177/25.18; 177/58
[58] Field of Search .............................. 177/25.18, 58

[56] References Cited

U.S. PATENT DOCUMENTS

| | | | |
|---|---|---|---|
| 493,797 | 3/1893 | Smyser | 177/58 X |
| 3,339,651 | 9/1967 | Garnett | 177/58 X |
| 4,437,527 | 3/1984 | Omae et al. | 177/25.18 |
| 4,465,150 | 8/1984 | Matsumoto | 177/25.18 |

Primary Examiner—George H. Miller, Jr.
Attorney, Agent, or Firm—Lackenbach Siegel Marzullo & Aronson

[57] ABSTRACT

A weighing machine for food products comprises a frame, a machine operating means, a product feeding means, a weighing means, temporary storage areas having means for discharging the product down into a means for conducting the product towards the machine exit, and a programmer processing unit which controls, activates and regulates the machine operation, characterized in that the product feeding means discharges the product down onto a series of troughs circularly arranged and linked to its respective weighing means, mounted on a horizontal platform rotating with respect to a central vertical axis, with the product of each trough being discharged into a selected stationary storage area from among a series of them, until the programmer processing unit orders the selective discharging of a corresponding storage area, after a batch of units of the product having a final predetermined weight has been deposited for storage into each selective storage area.

7 Claims, 5 Drawing Sheets

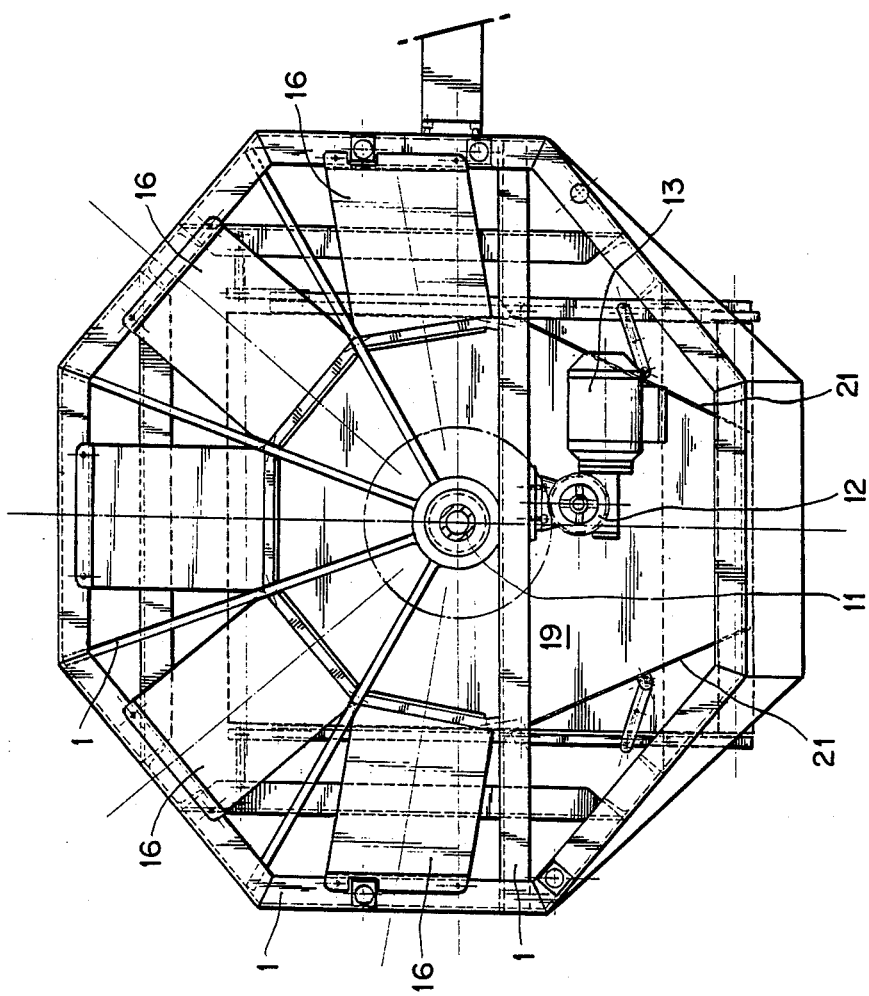

AUTOMATIC WEIGHING MACHINE FOR FOOD PRODUCTS AND THE LIKE

The present invention relates to an automatic weighing machine for food products, and which provide several advantages, which are described later, as well as other advantages inherent in the construction of the machine.

There are known machines for weighing fruit in which a relatively high number, for example, ten to fourteen, of containers exists that are fed with the products to be weighed. These products are fed from a common single entry, and they may be discharged, over other correlative products. The actual weighing is effected in the weighing containers. (It is possible that the machine may not have a weighing container in which case the machine performs direct weighing of the product. It is also possible that the machine may have an additional or double container under each weighing container). The known weighing machine comprises an electronic computer unit for making the calculation of the possible combinations of the weights of the products stored in the containers. The computer selects the containers having a weight sum (i.e. a total weight) which is the more approximate to the desired total weight, and then orders the discharging of the product over an exit conveyor provided in the machine. This procedure is known as "associative weighing", in which the product passes by several weighing points. An electronic computer looks for a combination of products, the total actual value of which is the nearest to the nominal desired weight. This strategy impairs or negatively affects the accuracy and regularity of the final desired weight of the obtained batches of product.

Also known is a kind of automatic weighing machine having a programmer processing unit (electronic) in which is effected the individual weighing of the products. The weighed products are conveyed to respective storage areas. The products are discharged into another transport means, usually in order to feed a packaging machine. This occurs after the respective storage area is filled with a batch of products of predetermined and regulatable weight, with a determinated tolerance regulatable also by the user.

A machine is described in Spanish Pat. No. 500,951, in which each unit of product entering the machine is weighted. The weighed units are directed to each respective storage area, so that the programmer processing unit knows permanently the actual weight of the weighed product existing in each of the storage areas. In addition, the actual weight of the product that is entering the machine is known because this product is being weighed in the machine. When the weight of the storage areas and especially the weight of the products stored in each respective storage area, approaches the predetermined nominal weight (with upper and lower limits or tolerances also predetermined) the machine look for, chooses and orders other product units sent to the storage area. This is done to provide an actual weight to permit the completion of a batch of product units having the prefixed final weight. This batch will be next discharged from the storage area onto the transport means arranged beneath the storage area, directing said batch towards the machine exit, in order to deliver it to a packing machine. The procedure just described corresponds to that known as "accumulative weighing". This means that the programmer processing unit takes into account permanently the actual weights of the batches of products being stored therein temporary in all of the storage areas of the weighing machine. The processing unit mathematically combines them with the actual weights of the product units, as the latter are being weighed. In this manner, a greater production per unit of time is obtained for batches of product units with a predetermined final weight. Also a lower number of rejected units is obtained in relation to the weighing machines previously known before the application date of Spanish Pat. No. 500,951.

The automatic weighing machine of the present invention utilizes the procedure of the machine provided with the improvements protected in said Spanish Pat. No. 500,951 and which in use provides very good results. The machine corresponds to the type of machines that comprises a support structure, or frame, for the machine members, actuating means for these members, feeding means for the corresponding product, means for weighing it, storage areas for storing it, and having means for discharging it onto other means for directing it towards the exit of the machine, and a programmer processing unit which registers the actual weight of the product that any moment of time is contained in all and each of the temporary storage areas. When the weight of the product contained in any given corresponding storage area reaches a total value prefixed by the machine user, the programmer processing unit orders the discharging of the batch of product units with the total prefixed weight. There is a suitable connection means between the programmer processing unit and the respective machine members, and there are conventional drive, control, and safety means, etc. for the machine.

The automatic weighing machine for food products of the invention is characterized in that the means for feeding the product to the entry in the machine, operated by the programmer processing unit, comprises, preferably a hopper, a channel and at least one endless band. The end of this band moves above a series of troughs, and is opened in the upper part in order to receive the product being discharged from this end. It is circularly arranged and connected, respectively and in overhanging arrangement, to corresponding means for weighing, said means being radially aligned and nearer to the center than to said troughs. This means for weighing being connected with the programmer processing unit, and mounted above a horizontal and rotating platform, through suitable means, with respect to a central vertical axis. These troughs have at least one movable wall operated by suitable means actuated by the programmer processing unit. It presents, under said troughs, a series of fixed storage areas, opened in the upper part in order to receive the corresponding product already weighed. There is also at least one movable wall also operated by suitable means actuated by the programmer processing unit, in order to allow the discharging of each batch of product units having a final predetermined weight. This discharging being effected onto the means for carrying the batches of product towards the machine exit.

The automatic weighing machine for food products of the present invention has the following advantages, in relation to the advantages of the known weighing machines, including the machine described in Spanish Pat. No. 500,951. These advantages include adaptability to a very wide range of products (peppers, onions, potatoes, garlics, citrus, sprouts, apples, nuts, beans and, in general, food products of various sizes), a high speed rate of production, with a minimum amount of rejection. This occurs without the risk of fortuitous damage to the initially rejected product due to the same not exiting from its corresponding trough, and also a greater regularity in the weight of the finally obtained batches. There is a self-regulation for the feeding, according to the final size or weight of the batches of product to be obtained.

The automatic weighing machine for foods products according the present invention has the previously described advantages as well as others that will be derived from the exemplary embodiment of said machine, which is described in detail subsequently. This is in order to facilitate an understanding of the above-mentioned characteristics and an explanation of various details. In the accompanying set of drawings, an example of the invention is provided, without being a limitation on the scope of this invention. This represents a practical embodiment of the automatic weighing machine of the invention.

In the drawings:

FIG. 4 shows a top plan view in the position represented in the FIG. 3a, but in which the rotating platform with the troughs has been eliminated and with the stationary storage areas in the machine being visible.

Figure 1:
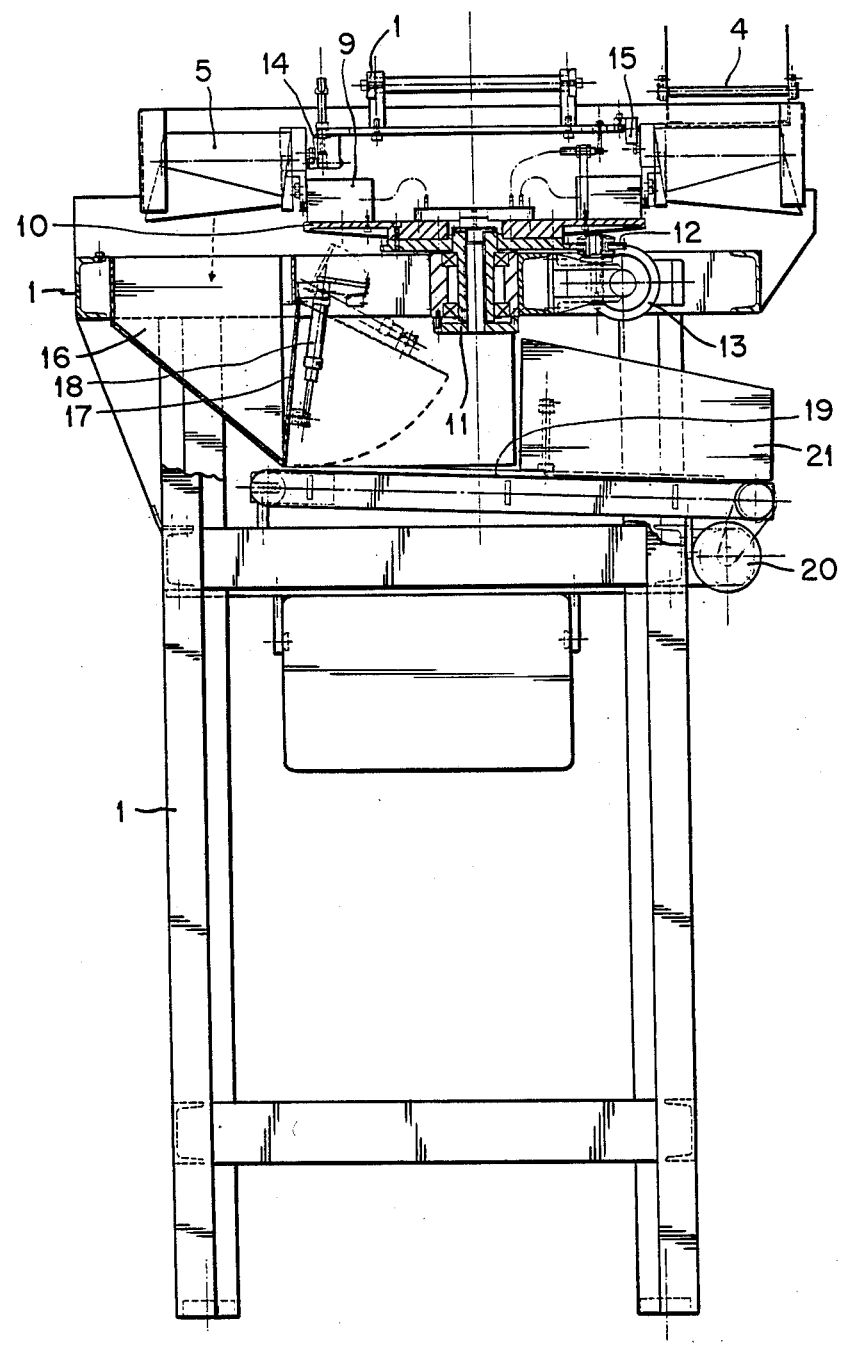
FIG. 1 shows an embodiment of the weighing machine in a side elevation view corresponding to a position in which the entrance of the machine is arranged towards the observer, said machine being shown having several sections for a better understanding.

As shown in the drawings, the automatic weighing machine for food products comprises a frame for the support and attachment of the several members of the machine. The frame allowing the height of the machine to be regulated, as well as mounting the machine on the floor and if it is desired, the frame also allows the affixing of the machine to the floor. It is understood that the frame -1- corresponds also to the upper or elevated part of the machine, particularly the upper structure of the same which contains among other members, the tracks for automatically operating the closure and the opening of the troughs during rotation.

In the entrance of the machine there are arranged feeding means for the correspondent product, actuated by the programmer processing unit in a form that will be described further on. The feeding means assembly preferably comprises a hopper -2- for charging the product to be weighed, and a channel -3- provided with a lifter conveyor, extended from the bottom of said hopper and routing the product to an endless band -4- in a horizontal position in this case. This free end is separated from the channel -3- and terminates above a series of troughs -5-.

The endless band -4- is arranged between two walls that channel the product during its transport from the hopper -2- to said free end. The hopper -2- and the channel -3- along with the lifter conveyor, are mounted so that it is possible to vary the inclination, as for example by means of a device -6- connected to the frame of the machine and to the frame of the hopper -2- and the channel -3- assembly. Likewise, said lifter conveyor and mechanical transmission -7- (that also could be electrical, as for example electromagnetic, or actuated by other conventional drive), which in turn is operated by an electric motor -8-, in this case through a reductor. Other types of motors may be used.

Figure 2:
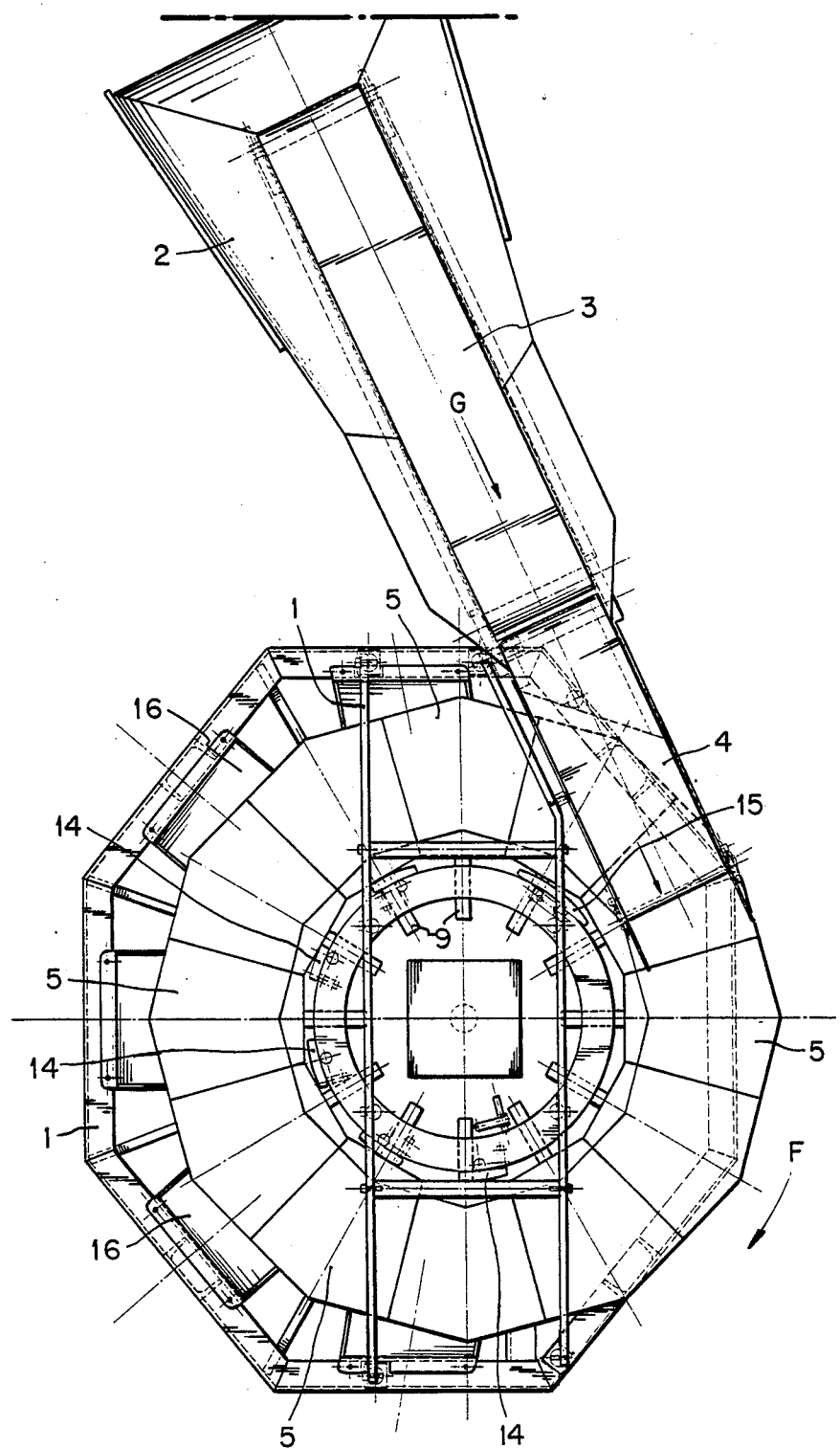
FIG. 2 is a top plan view of the machine according the FIG. 1, with the feeding assembly and the rotatable platform provided with troughs.

The series of troughs -5- comprises, in the present example, (twelve of them), circularly arranged (see particularly FIG. 2) and each trough -5- is connected in an overhanging form, to a corresponding weighing means -9-. Said means may be a transducer or other suitable type of electrical cell, because in the present example there are twelve means 9, radially aligned with said troughs -5- but being arranged nearer to the center axis of rotation of the assembly than to said troughs. The weighing means -9- are connected, if it is desired, in a regulatable position, above a platform -1- horizontally arranged and rotatable about a vertical axis. The platform is mounted on a guide support means -11- allowing a gentle rotation of the same, said platform being operated through a transmission means -12- by an electric motor -13-. In the present case, motor 13 is provided with a gear, reducer, and it is also possible to utilize other types of conventional motors. In FIG. 4 is seen, in detail, the mounting of said electric motor -13-, the structured part of the frame -1- and part of said means -11-.

The troughs -5- are opened in the upper part, in order to receive the product delivered by the endless band -4- which product proceeds, in the present case, from the hopper -2-. Each trough has at least one of its walls movable, operated by suitable means actuated by the programmer processing unit incorporated in the described weighing machine. In the present embodiment, movable walls of the troughs -5- are operated by mechanical means, formed by tracks -14- and -15-, regulatable and actuatable above the complementary means of the troughs. Assuming that the platform -10- rotates in a clockwise direction according to the arrow F in FIG. 2, the movable walls are compelled to be closed by the tracks -15-, before the respective trough passes under the endless band -4- in order to receive the corresponding product discharged by the same. The corresponding weighing of the product contained in the pertinent trough is immediately effected after which the movable walls of the same will be operated to be opened. Acting on instructions from the programmer processing unit, a product is discharged over a correspondent temporary storage area to be described as follows. The tracks -15- are displaceable by means actuated by the programmer processing unit, in order to situate them selectively in an active or in an inactive position. In the first case, the discharging of the corresponding trough over a storage area is selected by the programmer processing unit. To accommodate all of the described corresponding products, there are as many tracks -15- as there are storage areas.

Under the troughs -5- there are storage areas -16- stationary, or fixed, that is, attached to the frame -1- of the weighing machine, and in this embodiment five are arranged. These storage areas -16- are opened in the upper part in order to receive the already weighed corresponding product. The product proceeds from a trough -5- that at any given moment circulates above said storage area. According to a correspondent order given by the programmer processing unit and through suitable means, the opening of the movable walls of a trough is produced. This discharges the product contained in the same over said storage area. Each storage area -16- for the temporary storing of the correspondent product, has at least one of its walls -17- being movable, which wall is operated by means a pneumatic cylinder -18-. The cylinder maintains the storage area in closed position, when the cylinder rod is in extended condition, or opens and maintains it in this opened position when the rod is in retracted condition, as is represented in FIG. 1. FIG. 1 shows that the rotation of the cylinder-body, through a suitable regulable device is actuated by a switch, and is operating to detect its position and to limit the correspondent aperture angle. This is operated by the actuation of the cylinder -18- with instructions from the programmer processing unit, in order to discharge the corresponding batch of accumulated products from the storage area located therein, with the weight and limits of the same predetermined and regulated by the machine user.

Discharging of each batch of product units from the corresponding stationary storage area -16- is effected from above and onto endless band -19-, that is operated by an electric motor -20- and through a corresponding transmission. All of this is in order to direct the weighed batches of product to the machine exit. The electric motor can be replaced by another type of conventional motor.

It is pointed out that the endless band -19- and the motor -20-, with the corresponding transmission could be replaced by a simple inclined ramp, in order to facilitate the exiting of the weighted batches away from the machine. It is possible to utilize other known means to obtain the conveyance and the simple displacement of the batches of product outside of the machine. These batches may sequentially be fed in turn to another machine, such as a packaging machine.

In order to obtain a better direction of movement of the batches of product units already weighed, it is possible to arrange two screens -21- which can be oriented by known means. These screens can be utilizable as a sort of funnel having as a purpose to direct the batches of product units to the packaging machine that usually follows being discharged from the weighing machine.

The cylinders -18- can be pneumatic, hydraulic and also can be replaced by mechanical, electrical/or electro-mechanical devices, since the force to be exerted or applied by this cylinder or device, to operate the movable wall -17- of each storage area -16- is relatively small.

In the zone corresponding to the changing of the troughs -5-, i.e., to the discharging exit of the endless band -4- a track may be arranged in the form of an arch or circumference, for the bearing of, for example, loose wheels affixed to the inner part of the troughs, in order to avoid an overload of the weighing means -9- at that moment during which the product falls into the corresponding trough.

The endless band -4- can be adjusted to form any desired angle with the horizontal, apart from this indicated position, that is the represented in the example now being described.

It is convenient that the weighing of each trough -5- with the product contained therein shall be effected after a certain period of time starting after the discharging of the product from the endless band into the trough in order to stabilize it and thus attain an exact weight in the corresponding weighing means -9-. This is possible by means of a position sensor such as a microswitch, which is actuated by angular displacement, in relation to the cited vertical axis of the machine and is regulatable in order to achieve a correct weighing. When each trough -5- does not already contain a unit of product, because the product had already previously been discharged from the trough into a corresponding storage area -16- , the calibration of the scale is effected. The programmer processing unit is whenever necessary again given the information of the tare and the weight of the trough with the corresponding product whenever that has any variation in these data and of a periodic manner in either case. The programmer processing unit also operates the driving means for the lifter conveyor of the hopper -2- and the endless band -4-. This driving means is of variable speed and is regulatable, so that the feeding speed of the machine is adapted to the type of product and the quantity or weight desired for the final batch weight of the product. Thus a self-regulation is obtained for the feeding operation, with a regular cadence for this feeding procedure and consequently for the operation of the weighing machine.

It is sometimes convenient because of the economy of the driving means employed to have the platform rotate at a constant speed, although it may also be convenient that this speed be variable and regulatable.

The command for controlling the aperture between the walls of the troughs -5- is given by the programmer processing unit which makes a decision, according to the procedure to be followed for the same, and with the information that has been permanently received into the memory of the programmer in accordance with the above mentioned information. Also controlled is when the product contained at any moment should be discharged from the corresponding trough -5- into the storage means -16-. Each storage area is also actuated by the programmer processing unit, through the driving means of the movable wall of the same, in order to discharge the batch of product having predetermined weight and held at that moment in the corresponding storage area.

In the event that a product is rejected, this is probably because it cannot be combined with the products that are temporarily stored in any given storage area -16-, which has a very small probability of occurrence for this weighing machine. In this situation the trough -5- circulates under the discharging end of the endless band -4- without the band effecting the corresponding product discharge. This is because the band is stopped according to the corresponding order given by the programmer processing unit under these circumstances. The trough continues rotating until the programmer processing unit after a subsequent or second revolution of said product contained in said trough, allows the product to be discharged in a storage area -16-. Thus the recirculation of the rejected product is eliminated and the entry of new products in the machine is prevented during this time. In this manner, the product is much more gently treated than in the prior art machines.

The weighing machine of the invention, and the subsequently located packaging machine will be placed in the normal assembly line sequence for packaging the final product. By means of an electric signal or other conventional means, it is possible to coordinate the operating times and the shutdown times of both machines, and thus obtain a convenient coupling of these machines and a maximizing of the overall performance of the assembled line of machinery.

The data transmission, proceeding from the means and devices mounted in the platform -10- or connected to the programmer processing unit, can be made by means of infrared radiation, fiber optics or by other convenient means, and the supplying of electricity for the weighing means -9- (charge cells or transducers, etc.) can be effected by mechanical, electrical or other means, including by electrical induction, i.e., without cables, thus allowing a greater flexibility of said transmission and feeding, and a greater security in the same, particularly taking into account that the linkage should be effected through parts and members relatively rotatable.

In the drawings there are not shown any electrical, or pneumatic sources or of other fluid utilized in the weighing machine, connecting the several driving devices of the same with, for example, the compressed air equipment and through electro valves and other accessories for the control and driving by the programmer processing unit. In addition, there has been no showing comprising the machine of the invention and conventional driving, control and safety means, likewise for other specific functions desired.

The weighing machine may have protective covers and shelves for the user that completely cover the machine, and that can be totally or partially movable in order to provide access to the inner members of the machine.

Figure 3A:
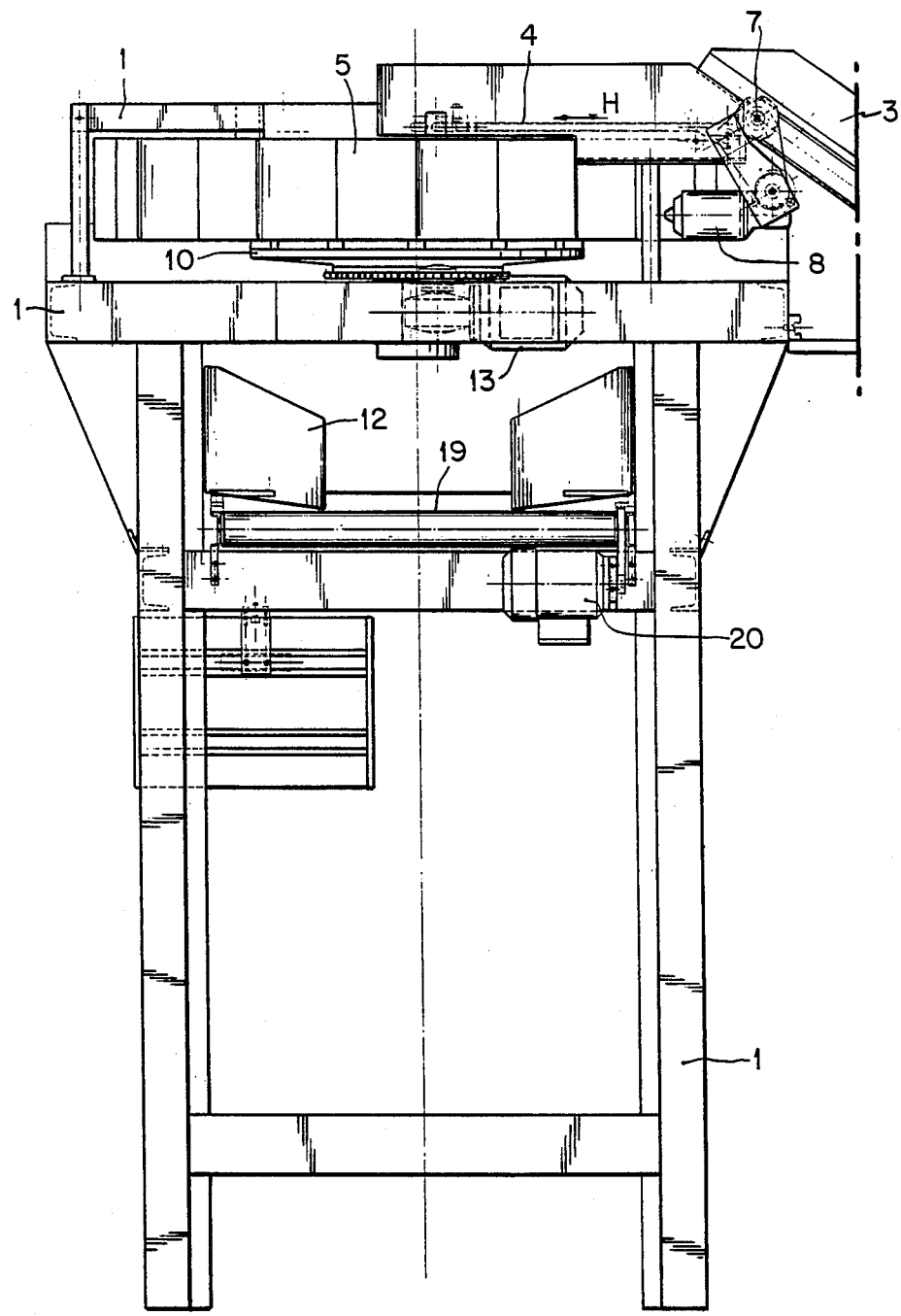
FIG. 3a shows an elevation view of the machine in a position in which the exit is oriented towards the observer.
Figure 3B:
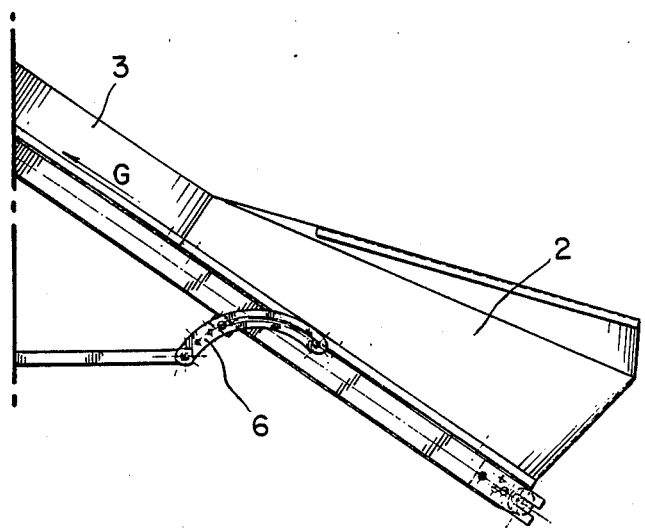
FIG. 3b shows the feeding assembly of the machine.

The operation of this weighing machine can be practically derived from the description up to now, and is represented in the drawings. The operation may be summarized in the following manner. The product disposed in the hopper -2- is directed, in the direction of the arrow G, by the lifter conveyor by the channel -3- to the endless band -4-. Band 4 continues carrying it in the direction of arrow H (see FIGS. 2 and 3), and the units of this product conveyed in this manner are discharged from the end of the endless band. This is the product separated from the hopper -2-, falling onto a corresponding trough -5- that, in each moment, is passing under said end of the endless band -4-. The platform with the troughs -5- and the respective weighing means -9- are rotated in the direction of the arrow F (FIG. 2), while at the same time the means for feeding the units of the product into the entry of the machine are actuated by the programmer processing unit. Each trough -5- that is receiving the corresponding units of product, continues its motion according to the described rotating movement. During a part of this movement, the weighing of the same with the product contained in it takes place and it continues its rotation circular movement. The movement of the discharge wall will promote the discharging of the product down into a corresponding storage area -16- whenever it should be so ordered by the programmer processing unit. The programmer processing unit determines the storage area over which this discharging of the contents of each trough -5- will be effected. The discharging takes place through the aperture of the walls of said troughs by means of the correspondent actuation of one of the tracks -14-. This activates the corresponding device for the discharging of the product contained in a trough over a storage area selected by the programmer processing unit. Continuing with the further rotation of the troughs, when the same approach the beginning of the departure point, that is approach the discharging zone of the endless band -4-, another track -15- will cause the closure of the movable walls of the troughs. Thus the troughs are further arranged to receive new units of product conveyed from the hopper -2-, and the described cycle is thereby repeated.

Each time that a batch of product units with the desired final weight is obtained in a storage area (and that has been selected and regulated by the user, with the tolerances also desired by him), the programmer processing unit produces an activation of means such as the pneumatic cylinder -18-. This causes the aperture of the movable wall -17- of the corresponding storage area -16- to open. Thus the discharging of said batch takes place over means such as the endless band -19- that transfer this batch of product towards the exit of the weighing machine. This process is repeated as many times as said batches in each storage area -16- are obtained.

In summary, the automatic weighing machine operates in a continuous manner in the rotation of the assembly formed by the pairs of trough -5- and weighing means -9-, whereas the means for feeding the product into the entrance of the machine, is formed by the hopper -2- with the lifter conveyor, the channel -3- and the endless band -4- being actuated by the programmer processing unit. This provides a self-regulation for the feeding steps. In the case wherein the product units disposed in one of the troughs -5-should be rejected (because they have an unsuitable weight for the procedure followed by the programmer processing unit), these product units are not selected to be discharged into any of the storage areas -16-. The trough with the rejected product is not actuated to permit discharging and continues conveying this rejected product unit under the exit of the endless band -4- through another revolution. Then the endless band at that moment will be stopped, by a corresponding order of the programmer processing unit, so as not to discharge any more products units onto this trough which was already charged with an unsuitable unit during the previous rotation. This trough proceeds by not discharging its unit until there eventually is an emptied out storage area which can accept as its first product unit, the unit with unsuitable weight. Then this unit is eventually selected for being discharged just like an other product contained in the same over a corresponding storage area -16-.

It should be noted that in the embodiment of the automatic weighing machine for food products of the present invention, it can be applied to all variations in form and size, absolute and relative, number of pieces and materials catalized in the same and other accessory circumstances that experience and practice make known, and also modifications of construction can be made with all of this being included in the scope of the following claims.

I claim:

1. Automatic weighing machine for food products, of the type that comprises a support structure or frame and having machine members, driving means for said machine, feeding means for the corresponding product, means for weighing it, storage areas for storing it and provided with means for discharging it over means for directing it towards the exit of the machine, and a programmer processing unit that registers the actual weight of the product unit as it is entering into the machine, as it is weighed and also the actual weight of the product unit that at any given moment is contained in all and each of the storage areas for temporary storage, and when the weight of a batch of the product units contained in a selected storage area reaches a value prefixed by the machine user, the programmer processing unit orders the discharging of the batch of product units having said final prefixed weight linkage means disposed between said programmer processing unit and the corresponding members of the machine, characterized in that the means for feeding the product into the entry of the machine is actuated by the programmer processing unit comprising a hopper, a channel and at least an endless band which band end terminates above a series of troughs opened in the upper part in order to receive the product unit being discharged from said end, circularly arranged and connected, to corresponding weighing means, radially aligned and located more near to the center than said troughs, said weighing means are linked with the programmer processing unit and are mounted on a horizontal and rotating platform, through suitable means, in relation to the central vertical axis of the machine; in that said troughs have at least one movable wall, operated by suitable means actuated by the programmer processing unit; and under said troughs are located a series of stationary storage areas, opened at the upper part in order to receive the corresponding product previously weighed and with at least one movable wall, also operated by suitable means actuated by the programmer processing unit, in order to allow the discharging of each batch of units of product with a final predetermined weight, which discharging is effected onto the means for directing said batches of product towards the machine exit.

2. An automatic weighing machine for food products comprising a frame, a machine operating means, a product feeding means which discharges the product over a series of troughs circularly arranged and linked to respective weighing means, said troughs mounted on a horizontal platform rotating with respect to a central vertical axis.

a stationary temporary storage area having means for discharging onto another means for conveying the product towards the machine exit, a programmer processing unit which controls, activates and regulates the machine operation, the product of each trough being discharged into a determined stationary storage area, or into a series of them, until the programmer processing unit orders the selective discharging of a corresponding storage area whenever said storage area contains an accumulated batch of product units having a final weight equal to the predetermined total weight for that storage area.

3. The automatic weighing machine for food products of claim 2.

wherein said programmer processing unit registers the actual weight of the product entering into the machine, as it is weighed and also the actual weight of the product that at every moment is contained in each and all of the storage areas for temporary storage, and when the weight of the product contained in a corresponding storage area reaches a value prefixed by the machine user, the programmer processing unit orders the discharging of the batch of product units with said final prefixed weight.

4. The automatic weighing machine for food products of claim 2.

wherein said means for feeding the product into the entry into the machine is actuated by the programmer processing unit comprising a hopper, a channel and at least an endless band, the end of which terminates above a series of troughs opened in the upper part in order to receive the product being discharged from said end, and circularly arranged and connected, respectively and in overhang form, to corresponding weighing means, radially aligned and more near to the center than said troughs.

5. The automatic weighing machine for food products of claim 2.

wherein said weighing means are linked with the programmer processing unit and are mounted on a horizontal and rotating platform, through suitable means, in relation to central vertical axis.

6. The automatic weighing machine for food products of claim 2.

wherein said troughs have at least one wall movable and being operated by suitable means actuated by the programmer processing unit.

7. The automatic weighing machine for food products of claim 2.

wherein under said troughs, there is a series of stationary storage areas, opened in the upper part in order to receive the corresponding product already weighed and with at least one of the walls movable, also operated by suitable means actuated by the programmer processing unit, in order to allow the discharging of each batch of units of product with a final predetermined weight, which discharging is effected over the means for directing said batches of product towards the machine exit.

* * * * *